United States Patent
Chang et al.

(10) Patent No.: US 9,432,640 B2
(45) Date of Patent: Aug. 30, 2016

(54) ILLUMINATION MODULE

(71) Applicant: DELTA ELECTRONICS, INC., Taoyuan Hsien (TW)

(72) Inventors: Keh-Su Chang, Taoyuan Hsien (TW); Yen-I Chou, Taoyuan Hsien (TW); Chi Chen, Taoyuan Hsien (TW); Jau-Shiu Chen, Taoyuan Hsien (TW); Meng-Han Liu, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 81 days.

(21) Appl. No.: 14/460,989

(22) Filed: Aug. 15, 2014

(65) Prior Publication Data
US 2015/0354787 A1    Dec. 10, 2015

(30) Foreign Application Priority Data
Jun. 6, 2014 (TW) .............................. 103119630 A (51) Int. Cl.
| F21V 9/16 | (2006.01) |
| H04N 9/00 | (2006.01) |
| G03B 21/20 | (2006.01) |
| G03B 33/08 | (2006.01) |

(52) U.S. Cl.
CPC .............. *H04N 9/00* (2013.01); *G03B 21/204* (2013.01); *G03B 33/08* (2013.01)

(58) Field of Classification Search
CPC  G03B 21/204; G03B 21/14; G03B 21/2066; G03B 21/28; G03B 26/008; H04N 2209/043; H04N 9/3114; H04N 9/315; H04N 9/3117; H04N 9/3155; G02F 2002/006; F21V 9/08; F21V 13/08; F21V 9/10; F21S 10/007

USPC ........ 362/293; 359/234, 491.01; 353/84, 97, 353/98; 313/489, 112
See application file for complete search history.

(56) References Cited

U.S. PATENT DOCUMENTS 5,455,709 A * 10/1995 Dula, III ............ G02B 26/0833
                                                      359/240
8,632,197 B2    1/2014 Chang
(Continued)

FOREIGN PATENT DOCUMENTS

| CN | 202109406 | 1/2012 |
| CN | 102566230 | 7/2012 |
| CN | 102645830 | 8/2012 |
| CN | 102722014 | 10/2012 |

(Continued)

*Primary Examiner* — Andrew Coughlin
*Assistant Examiner* — Meghan Ulanday
(74) *Attorney, Agent, or Firm* — Hauptman Ham, LLP (57) ABSTRACT

An illumination module includes a light source, a color wheel, an actuator, and a reflective unit. The light source is for providing a light beam with a first wavelength band. The color wheel has an outer annular section and an inner annular section. The color wheel includes a wavelength conversion segment disposed at the outer annular section and a plurality of filter segments disposed at the inner annular section. The wavelength conversion segment is configured to convert a portion of the light beam with the first wavelength band into a light beam with a second wavelength band, and has at least one wavelength conversion material including yttrium aluminum garnet (YAG) phosphors. The filter segments are respectively configured to filter desired wavelength bands of the light beam. The reflective unit is configured to reflect the light beam passing through the outer annular section to the inner annular section.

18 Claims, 9 Drawing Sheets

(56) References Cited

U.S. PATENT DOCUMENTS

2013/0123664 A1 5/2013 Lin et al.
2013/0229634 A1 9/2013 Hu et al.
2013/0258639 A1 10/2013 Hu et al.
2014/0022512 A1 1/2014 Li et al.

FOREIGN PATENT DOCUMENTS

| | | |
|---|---|---|
| CN | 102818170 | 12/2012 |
| CN | 102854728 | 1/2013 |
| CN | 103292253 | 9/2013 |
| TW | 201327015 | 7/2013 |

* cited by examiner

ILLUMINATION MODULE

RELATED APPLICATIONS

This application claims priority to Taiwan Application Serial Number 103119630, filed Jun. 6, 2014, which is herein incorporated by reference.

BACKGROUND

1. Field of Invention

The present invention relates to an illumination module.

2. Description of Related Art

In recent years, slim and compact projection devices are becoming the mainstream in the market with the improvement on the manufacturing technology of the projection devices. As such, a display illuminating module as light source of the projection device needs to be reduced in size along with the size reduction of the projection device. However, the downsized display illuminating module means less accommodating space for elements. Therefore, many in the industry are striving to keep high efficiency and low energy consumption output for the display illuminating module under the limited number of the elements.

SUMMARY

An aspect of the present invention is to provide an illumination module including a light source, a color wheel, an actuator, and a reflective unit. The light source is for providing a light beam with a first wavelength band. The color wheel is disposed correspondingly to the light source along the traveling path of the light beam. The color wheel has an outer annular section and an inner annular section. A radius of the inner annular section has a smaller length than a radius of the outer annular section. The color wheel includes a wavelength conversion segment and a plurality of filter segments. The wavelength conversion segment is disposed at the outer annular section, and is configured to convert a portion of the light beam with the first wavelength band into a light beam with a second wavelength band. The wavelength conversion segment has at least one wavelength conversion material including yttrium aluminum garnet (YAG) phosphors. The filter segments are disposed at the inner annular section and are respectively configured to filter desired wavelength bands of the light beam. The actuator is connected to the color wheel and is configured to rotate the color wheel. The reflective unit is disposed correspondingly to the color wheel along the traveling path of the light beam and is configured to reflect the light beam passing through the outer annular section of the color wheel to the inner annular section of the color wheel. In the same time period, a position that the light beam illuminates the inner annular section of the color wheel is located between a position that the light beam illuminates the outer annular section of the color wheel and a center of the color wheel.

In one or more embodiments, the illumination module further includes a lens configured to focus the light beam illuminating the outer annular section of the color wheel and collect the light beam passing through the inner annular section of the color wheel.

In one or more embodiments, the illumination module further includes a lens configured to collect the light beam passing through the outer annular section of the color wheel and focus the light beam illuminating the inner annular section of the color wheel.

In one or more embodiments, the color wheel further includes a transmission segment disposed at the outer annular section of the color wheel.

In one or more embodiments, the color wheel further includes a diffuser disposed at the inner annular section of the color wheel and adjacent to the transmission segment.

In one or more embodiments, the color wheel further includes a light-modulation segment disposed at the outer annular section of the color wheel. The light-modulation segment is configured to convert a portion of the light beam with the first wavelength band into a light beam with a third wavelength band, and the light beam with the third wavelength band and the light beam with the first wavelength band are mixed to be a light beam with a fourth wavelength band.

In one or more embodiments, the light-modulation segment is made of a material including lutetium aluminum garnet (LuAG), silicon oxynitride, silicone, or any combination thereof.

In one or more embodiments, the reflective unit includes a first reflector and a second reflector. The first reflector is configured to reflect the light beam passing through the outer annular section of the color wheel to the second reflector, and the second reflector is configured to reflect the light beam propagating from the first reflector to the inner annular section of the color wheel.

Another aspect of the present invention is to provide an illumination module including a light source, a color wheel, an actuator, a first dichroic element, and a first reflector. The light source is for providing a light beam with a first wavelength band. The color wheel is disposed correspondingly to the light source along the traveling path of the light beam. The color wheel has an outer annular section and an inner annular section. A radius of the inner annular section has a smaller length than a radius of the outer annular section. The color wheel includes a wavelength conversion segment and a plurality of filter segments. The wavelength conversion segment is disposed at the outer annular section, is configured to convert a portion of the light beam with the first wavelength band into a light beam with a second wavelength band, and reflects the light beam with the second wavelength band. The wavelength conversion segment has at least one wavelength conversion material including yttrium aluminum garnet (YAG) phosphor. The filter segments are disposed at the inner annular section and are respectively configured to filter desired wavelength bands of the light beam. The actuator is connected to the color wheel and is configured to rotate the color wheel. The first dichroic element is disposed between the light source and the color wheel along the traveling path of the light beam. The first dichroic element allows the light beam with the first wavelength band to pass therethrough, and reflects the light beam with the second wavelength band. The first reflector is configured to reflect the light beam propagating from the first dichroic element to the inner annular section of the color wheel. In the same time period, a position that the light beam illuminates the inner annular section of the color wheel is located between a position that the light beam illuminates the outer annular section of the color wheel and a center of the color wheel.

In one or more embodiments, the illumination module further includes a lens disposed between the first dichroic element and the color wheel and between the first reflector and the color wheel.

In one or more embodiments, the color wheel further includes a transmission segment disposed at the inner annular section of the color wheel.

In one or more embodiments, a portion of the light beam with the first wavelength band is allowed to pass through a portion of the wavelength conversion segment of the color wheel, and the illumination module further includes a second reflector and a second dichroic element. The second reflector is configured to reflect the light beam passing through the inner annular section of the color wheel. The second dichroic element allows the light beam passing through the wavelength conversion segment to pass therethrough, and reflects the light beam propagating from the second reflector.

In one or more embodiments, the illumination module further includes a lens disposed between the second reflector and the color wheel and between the second dichroic element and the color wheel.

In one or more embodiments, the color wheel further includes a light-blocking segment disposed at the inner annular section of the color wheel and configured to block the light beam with the second wavelength band.

Still another aspect of the present invention is to provide a method for manufacturing a color wheel including manufacturing a plurality of sectional components. The sectional components are assembled to form the whole color wheel. Manufacturing each of the sectional components includes using a first mask to expose a first area of a transparent plate and block a second area of the transparent plate. A radius of the first area has a smaller length than that of the second area. A filter layer is formed on the first area. The first mask is removed. A second mask is used to block the first area and expose the second area. At least one wavelength conversion material is formed on the second area. The second mask is removed.

In one or more embodiments, the wavelength conversion material includes yttrium aluminum garnet (YAG) phosphor.

In one or more embodiments, manufacturing each of the sectional components further includes forming a reflective film or a dichroic mirror on the second area before forming the wavelength conversion material.

In one or more embodiments manufacturing each of the sectional components further includes forming an anti-reflection layer on entire of the transparent plate.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
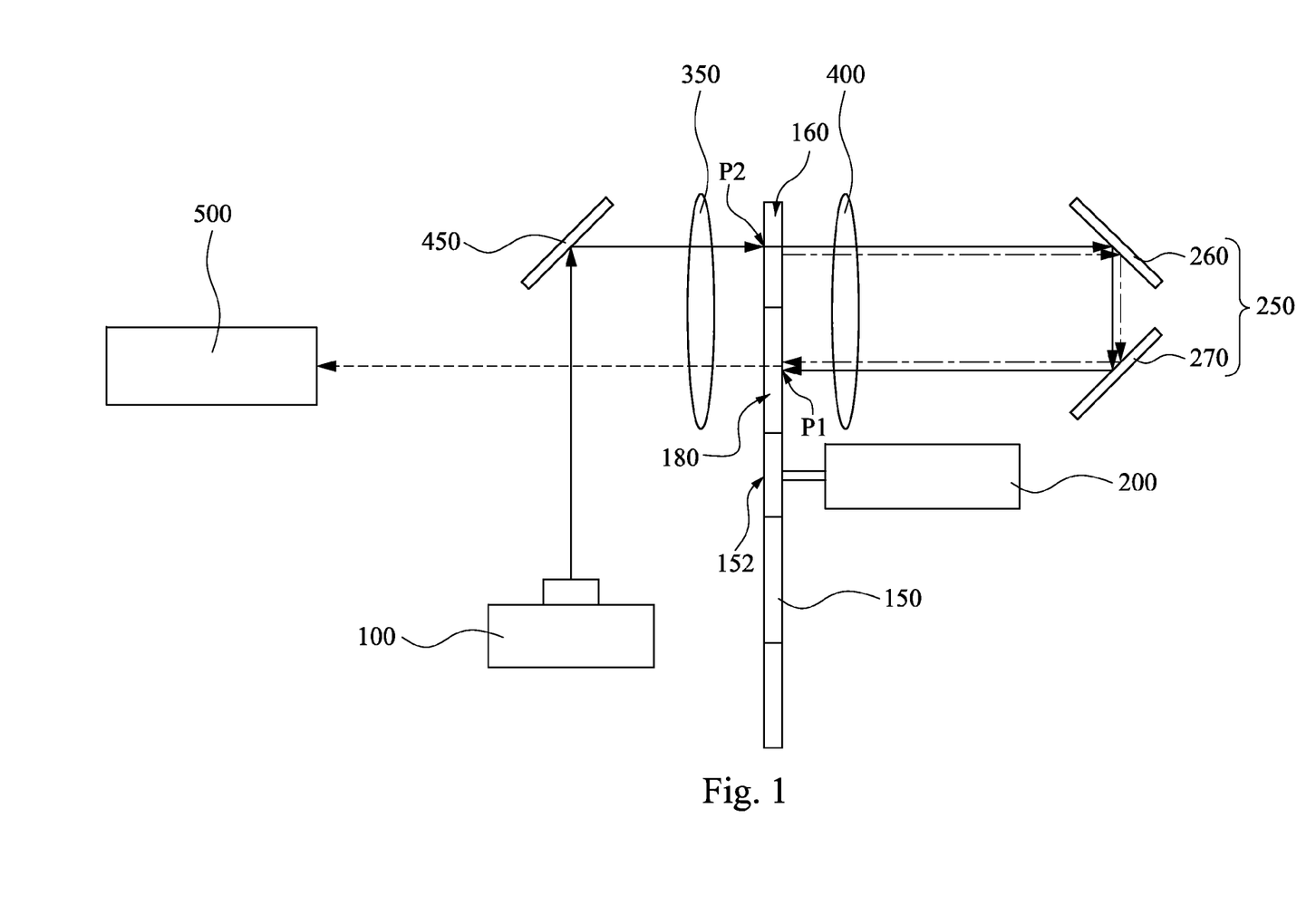
FIG. 1 is an optical diagram of an illumination module according to one embodiment of the present invention.
Figure 2:
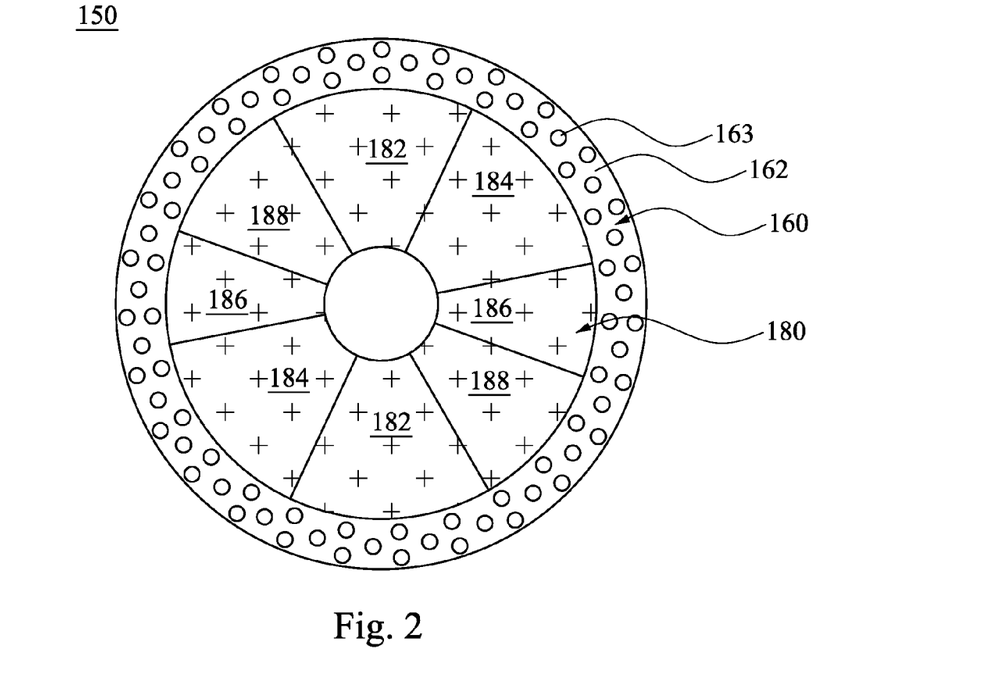
FIG. 2 is a front view of a color wheel of FIG. 1 according to one embodiment.

FIG. 1 is an optical diagram of an illumination module according to one embodiment of the present invention, and FIG. 2 is a front view of a color wheel 150 of FIG. 1 according to one embodiment. The illumination module includes a light source 100, a color wheel 150, an actuator 200, and a reflective unit 250. The light source 100 is for providing a light beam with a first wavelength band. The color wheel 150 is disposed correspondingly to the light source 100 along the traveling path of the light beam. The color wheel 150 has an outer annular section 160 and an inner annular section 180. A radius of the inner annular section 180 has a smaller length than a radius of the outer annular section 160. The color wheel 150 includes a wavelength conversion segment 162 and a plurality of filter segments. For example, in FIG. 2, a first filter segment 182, a second filter segment 184, a third filter segment 186, and a fourth filter segment 188 are disposed at the inner annular section 180 of the color wheel 150, and the first filter segment 182, the second filter segment 184, the third filter segment 186, and the fourth filter segment 188 respectively allow to filter light beams with different (desired) wavelength bands. The wavelength conversion segment 162 is disposed at the outer annular section 160, and is configured to convert a portion of the light beam with the first wavelength band into a light beam with a second wavelength band. The wavelength conversion segment 162 has at least one wavelength conversion material 163 including yttrium aluminum garnet (YAG) phosphors. The actuator 200 is connected to the color wheel 150 and is configured to rotate the color wheel 150. The reflective unit 250 is disposed correspondingly to the color wheel 150 along the traveling path of the light beam and is configured to reflect the light beam passing through the outer annular section 160 of the color wheel 150 to the inner annular section 180 of the color wheel 150. In the same time period, a position P1 that the light beam illuminates the inner annular section 180 of the color wheel 150 is located between a position P2 that the light beam illuminates the outer annular section 160 of the color wheel 150 and a center 152 of the color wheel 150. The light beam with a specific "wavelength band" herein indicates a light beam with a specific wavelength or with a specific wavelength range, or substantially a light beam with a specific waveform.

Therefore, the light beam provided by the light source 100 illuminates the outer annular section 160 of the color wheel 150. A portion of the light beam is converted into the light beam with the second wavelength band by the wavelength conversion segment 162. Both of the light beams with the first wavelength band and with the second wavelength band pass through the color wheel 150, and are reflected to the inner annular section 180 of the color wheel 150 by the reflective unit 250, and then sequentially are filtered to be light beams with different wavelength bands via the first filter segment 182, the second filter segment 184, the third filter segment 186, and the fourth filter segment 188. Therefore, the illumination module of the present embodiment can generate the light beams with different wavelength bands as long as the color wheel 150 rotates.

Since the wavelength conversion material 163 of the present embodiment includes YAG phosphors, whose emission spectrum ranges from green to red light with wavelength ranging from about 500 nm to about 650 nm, only single wavelength conversion segment 162 can match all of the first filter segments 182, the second filter segment 184, the third filter segment 186, and the fourth filter segment 188 to obtain light beams with different wavelength bands to satisfy color gamut requirements. In addition, for the high power light beam with the first wavelength band, the yellow light emitted from the YAG phosphors can be filtered to get the red light, which has higher efficiency than the red light emitted from pure red phosphors. Also, the YAG phosphors have a good heat dissipation property. Moreover, the amounts of red light determine the brightness of projection frames. That is, under the white balance satisfaction, the more the red light fraction is, the higher the brightness of projection frames is. Therefore, the illumination module of the present embodiment is suitable for the high power light source 100 to increase the brightness of the projection frame and assist heat dissipation. In addition, the wavelength conversion segment 162 is disposed at the outer annular section 160 of the color wheel 150. Compared with the inner annular section 180, the outer annular section 160 has a longer arc length to facilitate the heat dissipation of the wavelength conversion segment 162. Moreover, since in the same time period, the position P1 that the light beam illuminates the inner annular section 180 of the color wheel 150 is located between the position P2 that the light beam illuminates the outer annular section 160 of the color wheel 150 and the center 152 of the color wheel 150, the reflective unit 150 occupies less space, facilitating miniaturization of the illumination module.

Reference is made to FIG. 2. In this embodiment, the light beam with the first wavelength band can be blue light, and the light beam with the second wavelength band, i.e., the emission light of the YAG phosphors, can be yellow light, where the second wavelength band ranges from about 500 nm to about 650 nm. The first filter segment 182 may be a red filter segment that allows red light to pass therethrough, the second filter segment 184 may be a green filter segment that allows green light to pass therethrough, the third filter segment 186 may be a blue filter segment that allows blue light to pass therethrough, and the fourth filter segment 188 may be a yellow filter segment that allows yellow light to pass therethrough. It is noted that in FIG. 2, the filter wavelengths, the arrangement, and the areas of the first filter segments 182, the second filter segment 184, the third filter segment 186, and the fourth filter segment 188 are illustrative only and should not limit the scope of the claimed invention. A person having ordinary skill in the art may select suitable filter wavelengths, arrangement, and areas for the first filter segments 182, the second filter segment 184, the third filter segment 186, and the fourth filter segment 188 according to actual requirements.

Reference is made to FIG. 1. In this embodiment, the illumination module further includes a lens 350 for focusing the light beam to illuminate the outer annular section 160 of the color wheel 150, and for collecting the light beam to illuminate the inner annular section 180 of the color wheel 150. More specifically, the light beams at different regions can be focused and be collected simultaneously by designing the curvature and the thickness of the lens 350. Therefore, only single lens is enough. Not only the space is saved, but also the assembly process is simplified. The illumination module can further include a lens 400 for collecting the light beam passing through the outer annular section 160 of the color wheel 150, and focusing the light beam to illuminate the inner annular section 180 of the color wheel 150. The light beams can be focused and be collected simultaneously by designing the curvature and the thickness of the lens 400.

In one or more embodiments, the reflective unit 250 can include a first reflector 260 and a second reflector 270. The first reflector 260 is configured to reflect the light beam passing through the outer annular section 160 of the color wheel 150 to the second reflector 270, and the second reflector 270 is configured to reflect the light beam propagating from the first reflector 260 to the inner annular section 180 of the color wheel 150. To further reduce the entire size of the illumination module, the illumination module can further include a third reflector 450 for reflecting the light beam propagating from the light source 100 to the outer annular section 160 of the color wheel 150. However, in other embodiments, the light beam can directly illuminate the color wheel 150 without being reflected. Furthermore, the illumination module can further include an integral rod 500 disposed at the traveling path after the light beam passing through the inner annular section 180 of the color wheel 150. The light beam can be reflected many times inside the integral rod 500 for light uniformity.

Reference is made to FIGS. 1 and 2. In operation, in the first time period, the actuator 200 rotates the first filter segment 182, i.e., the red filter segment, on the traveling path of the light beam. The blue light, i.e., the light beam with the first wavelength band, emitted from the light source 100 illuminates the outer annular section 160, i.e., the wavelength conversion segment 162, of the color wheel 150 after being reflected by the third reflector 450 and being focused by the lens 350. The wavelength conversion segment 162 converts a portion of the light beam into yellow light, i.e., the light beam with the second wavelength band. Both of the yellow and the blue light pass through the color wheel 150, are collected by the lens 400, and then illuminate the first reflector 260. The yellow and the blue light are reflected by the first reflector 260 and the second reflector 270 sequentially, and illuminate the first filter segment 182 of the inner annular section 180 of the color wheel 150 after being focused by the lens 400. The blue light is blocked by the first filter segment 182, and the yellow light is filtered as red light. The red light then passes through the color wheel 150, is collected by the lens 350, and enters the integral rod 500.

In the second time period, the actuator 200 rotates the second filter segment 184, i.e., the green filter segment, on the traveling path of the light beam. The blue light emitted from the light source 100 illuminates the color wheel 150. Since the traveling path of the light beam from the light source 100 to the inner annular section 180 of the color wheel 150 in this time period is the same as that in the first time period, a description in this regard will not be repeated hereinafter. After being focused by the lens 400, both of the yellow and the blue light illuminate the second filter segment 184 of the inner annular segment 180 of the color wheel 150. The blue light is blocked by the second filter segment 184, and the yellow light is filtered as green light. The green light then passes through the color wheel 150, is collected by the lens 350, and enters the integral rod 500.

In the third time period, the actuator 200 rotates the third filter segment 186, i.e., the blue filter segment, on the traveling path of the light beam. The blue light emitted from the light source 100 illuminates the color wheel 150. Since the traveling path of the light beam from the light source 100 to the inner annular section 180 of the color wheel 150 in this time period is the same as that in the first time period, a description in this regard will not be repeated hereinafter. After being focused by the lens 400, both of the yellow and the blue light illuminate the third filter segment 186 of the inner annular segment 180 of the color wheel 150. The yellow light is blocked by the third filter segment 186 while the blue light passes therethrough. The blue light then passes through the color wheel 150, is collected by the lens 350, and enters the integral rod 500.

In the fourth time period, the actuator 200 rotates the fourth filter segment 188, i.e., the yellow filter segment, on the traveling path of the light beam. The blue light emitted from the light source 100 illuminates the color wheel 150. Since the traveling path of the light beam from the light source 100 to the inner annular section 180 of the color wheel 150 in this time period is the same as that in the first time period, a description in this regard will not be repeated hereinafter. After being focused by the lens 400, both of the yellow and the blue light illuminate the fourth filter segment 188 of the inner annular segment 180 of the color wheel 150. The blue light is blocked by the fourth filter segment 188 while the yellow light passes therethrough. The yellow light then passes through the color wheel 150, is collected by the lens 350, and enters the integral rod 500. Therefore, the illumination module can sequentially generate red light, green light, blue light, and yellow light as the color wheel 150 continuously rotates.

Figure 3:
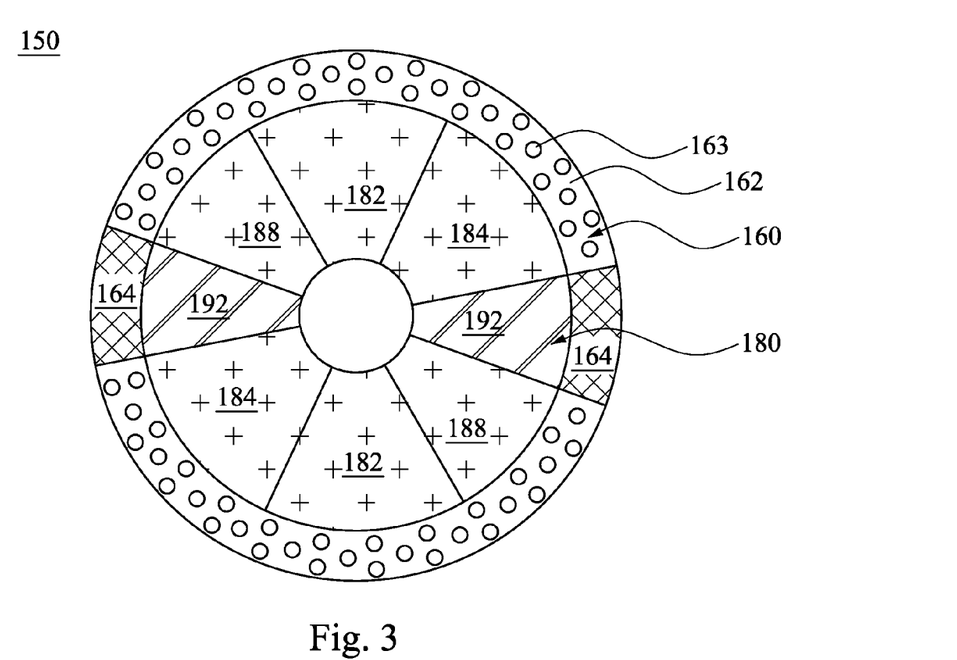
FIG. 3 is a front view of a color wheel of FIG. 1 according to another embodiment.
Figure 4:
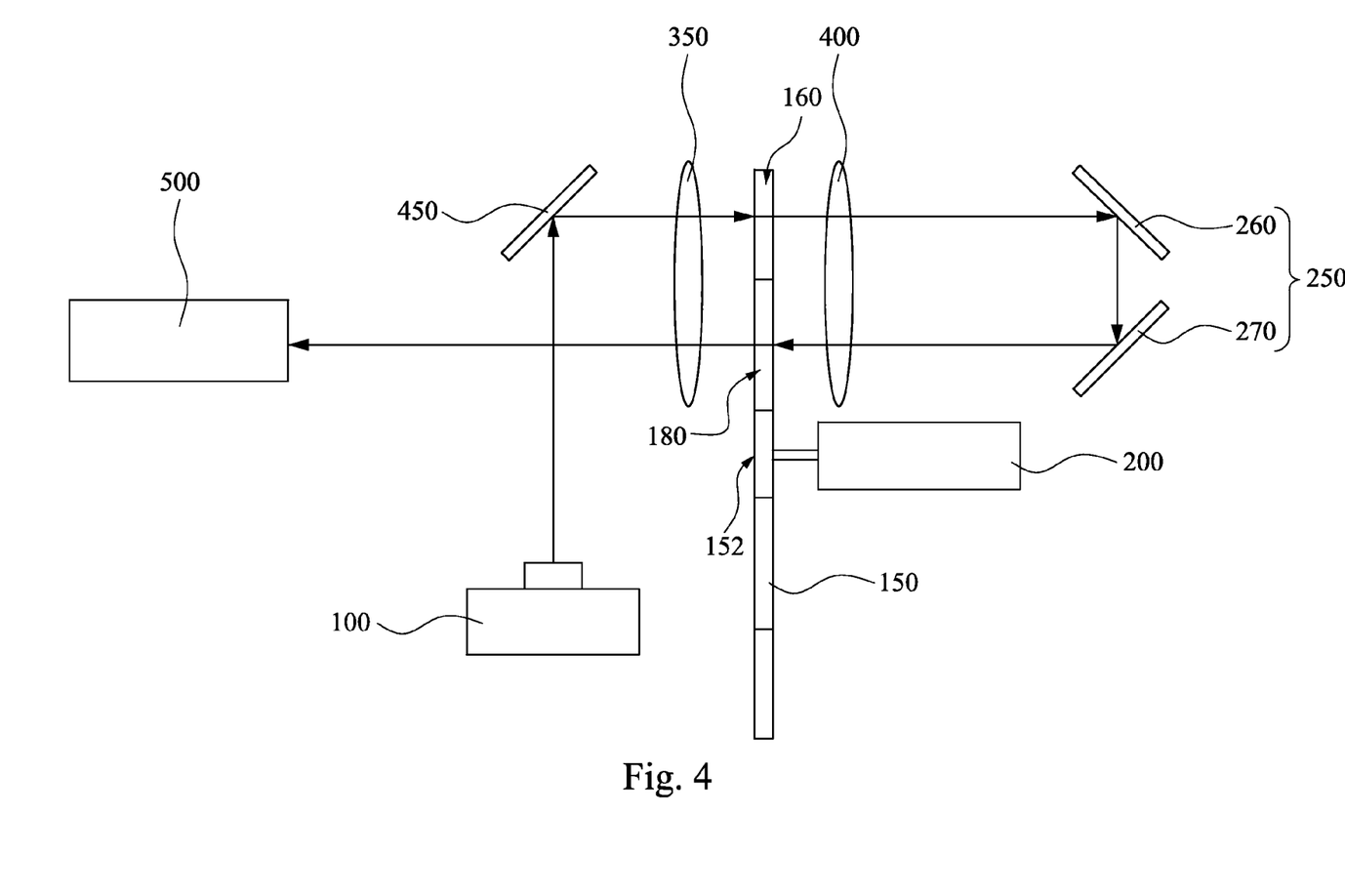
FIG. 4 is an optical diagram of the illumination module of FIG. 1 in another time period.

However, the configuration of the color wheel 150 is not limited to the embodiment of FIG. 2. FIG. 3 is a front view of the color wheel 150 of FIG. 1 according to another embodiment. The difference between the present embodiment and the embodiment of FIG. 2 pertains to a diffuser 192, which replaces the third filter segment 186 of FIG. 2, and the presence of a transmission segment 164. In this embodiment, the color wheel 150 further includes the transmission segment 164 and the diffuser 192. The transmission segment 164 is disposed at the outer annular section 160 of the color wheel 150. The diffuser 192 is disposed at the inner annular section 180 of the color wheel 150 and adjacent to the transmission segment 164. The transmission segment 164 may be an anti-reflection coating, and the claimed scope of the present invention is not limited in this respect. FIG. 4 is an optical diagram of the illumination module of FIG. 1 in another time period. In operation, since the optical paths in the first, the second, and the fourth time period of this embodiment are the same as that in FIG. 1, a description in this regard will not be repeated hereinafter. In the third time period, the actuator 200 rotates the transmission segment 164 and the diffuser 192 on the traveling path of the light beam. The blue light emitted from the light source 100 illuminates the transmission segment 164 of the outer annular section 160 of the color wheel 150 after being reflected by the third reflector 450 and being focused by the lens 350. The blue light passes through the color wheel 150, is collected by the lens 400, and then illuminates the first reflector 260. The blue light is reflected by the first reflector 260 and the second reflector 270 sequentially, and illuminates the diffuser 192 of the inner annular section 180 of the color wheel 150 after being focused by the lens 400. The diffuser 192 can reduce the coherence and increase the uniformity of the blue light. The blue light then passes through the color wheel 150, is collected by the lens 350, and enters the integral rod 500.

It is noted that since the diffuser 192 can reduce the coherence of the blue light, the color wheel 150 of FIG. 3 can be applied to an illumination module with laser light source 100. However, another transmission segment can replace the diffuser 192 if the light source 100 is not a laser or the light source 100 provides uniformly light, and the claimed scope is not limited in this respect.

Figure 5:
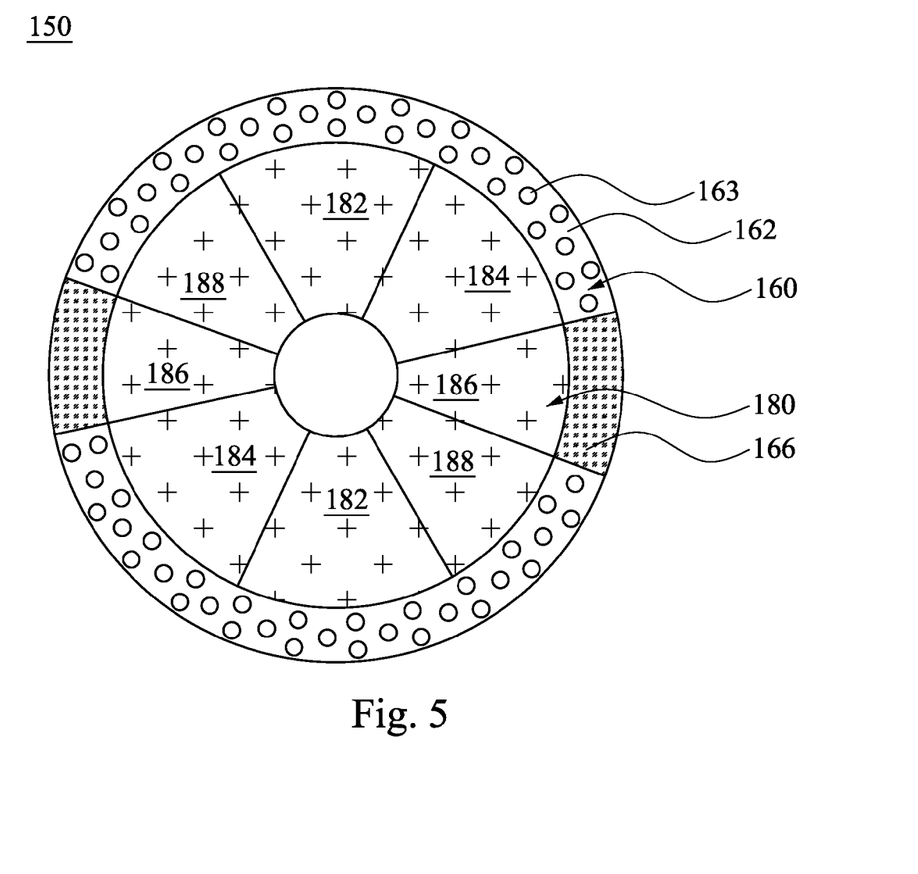
FIG. 5 is a front view of a color wheel of FIG. 1 according to yet another embodiment.

FIG. 5 is a front view of the color wheel 150 of FIG. 1 according to yet another embodiment. The difference between the present embodiment and the embodiment of FIG. 2 pertains to the presence of a light-modulation segment 166. In this embodiment, the color wheel 150 further includes a light-modulation segment 166 disposed at the outer annular section 160 of the color wheel 150 and adjacent to the third filter segment 186, i.e., the blue filter segment. The light-modulation segment 166 is configured to convert a portion of the light beam with the first wavelength band into a light beam with a third wavelength band, and the light beam with the third wavelength band and the light beam with the first wavelength band are mixed to be a light beam with a fourth wavelength band. For example, the light-modulation segment 166 can be made of a material including lutetium aluminum garnet (LuAG), which emits green light, i.e., the light beam with the third wavelength band, and the main wavelength thereof is about 520 nm. When the blue light, i.e., the light beam with the first wavelength band, illuminates the light-modulation segment 166, the light-modulation segment 166 emits green light. The green and the blue light are mixed to be the light beam with the fourth wavelength band which ranges between the first wavelength band and the third wavelength band. The light beam with the fourth wavelength band can replace the blue light, such that the projection frames formed by the illumination module of this embodiment have good color performance. The light beam with the fourth wavelength band then illuminates the third filter segment 186, which filters the light beam with the fourth wavelength band to be blue light with a specific wavelength for enhancing the saturation of the projection frames.

In another embodiments, the light-modulation segment 166 can be made of a material including lutetium aluminum garnet (LuAG), whose emission light beam with the third wavelength band has a main wavelength about 520 nm, silicon oxynitride, whose emission light beam with the third wavelength band has a main wavelength about 490 nm, silicone, whose emission light beam with the third wavelength band has a main wavelength about 460 nm, or any combination thereof.

Figure 6A:
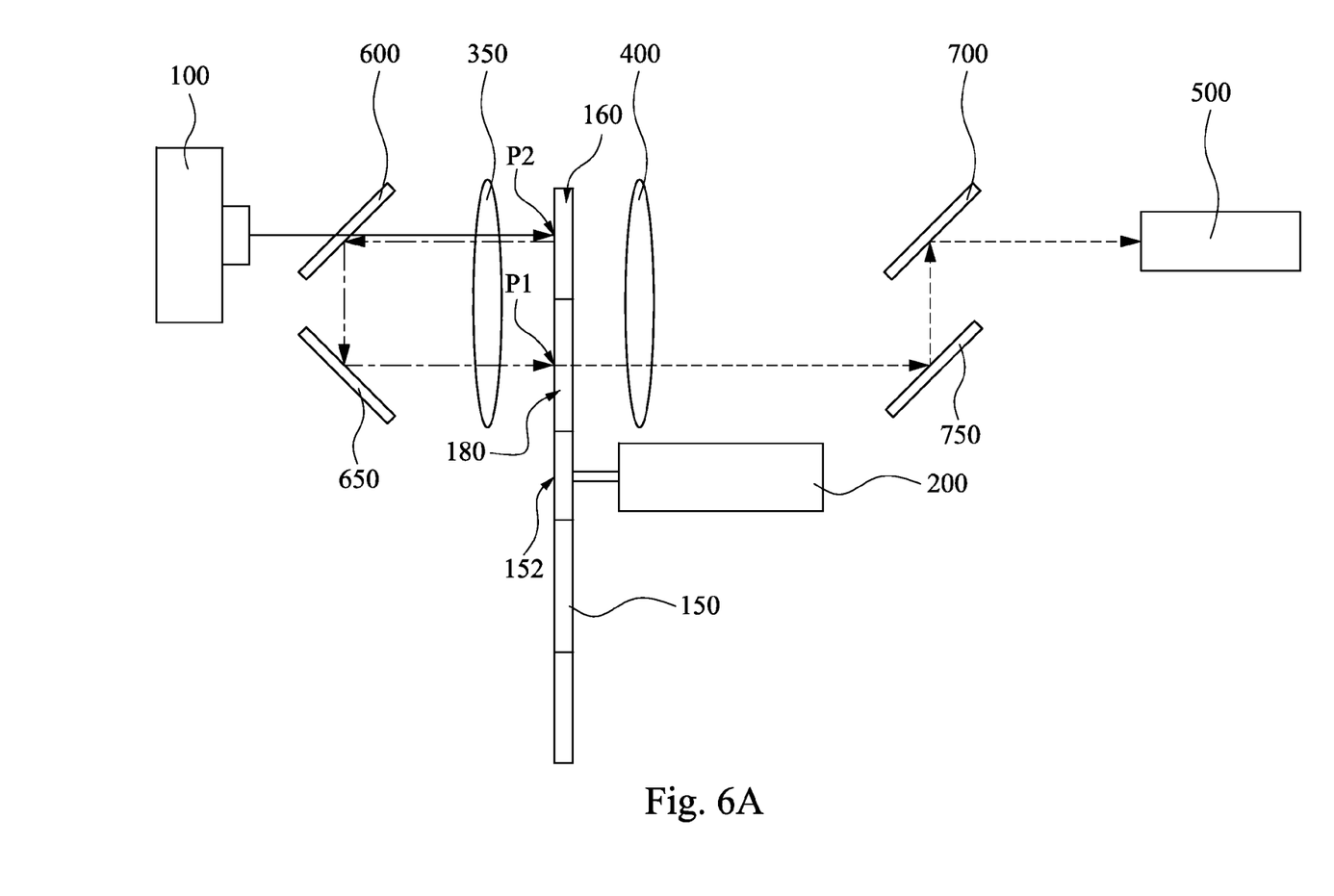
FIG. 6A is an optical diagram of an illumination module according to another embodiment of the present invention in some time periods.
Figure 7:
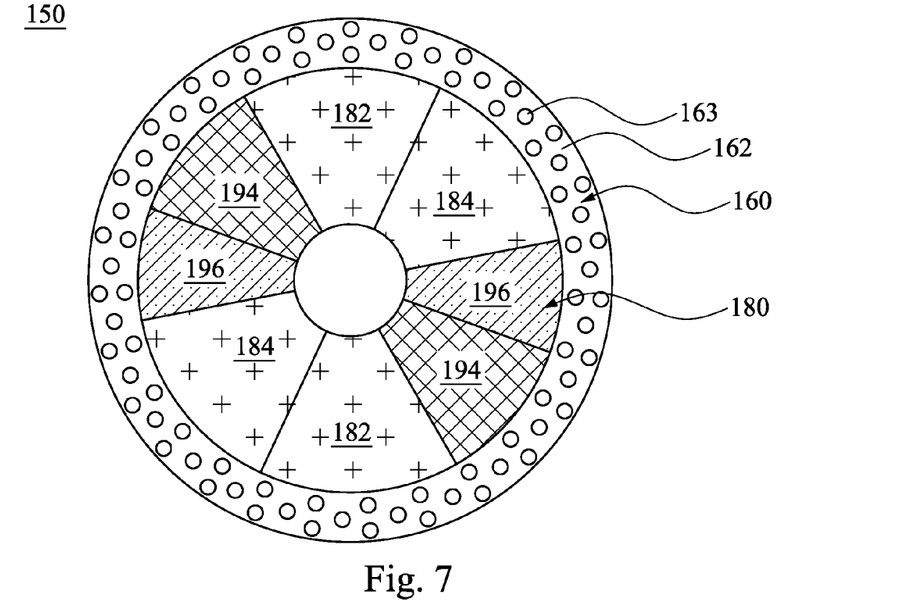
FIG. 7 is a front view of a color wheel of FIG. 6A.

FIG. 6A is an optical diagram of an illumination module according to another embodiment of the present invention in some time periods, and FIG. 7 is a front view of a color wheel 150 of FIG. 6A. The illumination module 100 includes a light source 100, a color wheel 150, an actuator 200, a first dichroic element 600, and a first reflector 650. The light source 100 is for providing a light beam with a first wavelength band. The color wheel 150 is disposed correspondingly to the light source 100 along the traveling path of the light path. The color wheel 150 has an outer annular section 160 and an inner annular section 180. A radius of the inner annular section 180 has a smaller length than a radius of the outer annular section 160. The color wheel 150 includes a wavelength conversion segment 162 and a plurality of filter segments. For example, in FIG. 7, the color wheel 150 includes a first filter segment 182 and a second filter segment 184. The wavelength conversion segment 162 is disposed at the outer annular section 162, is configured to convert a portion of the light beam with the first wavelength band into a light beam with a second wavelength band, and reflects the light beam with the second wavelength band. The wavelength conversion segment 162 has at least one wavelength conversion material 163 including yttrium aluminum garnet (YAG) phosphors. The first filter segment 182 and the second filter segment 184 are disposed at the inner annular section 180 and are respectively configured to filter desired wavelength bands of the light beam. The actuator 200 is connected to the color wheel 150 and is configured to rotate the color wheel 150. The first dichroic element 600 is disposed between the light source 100 and the color wheel 150 along the traveling path of the light beam. The first dichroic element 600 allows the light beam with the first wavelength band to pass therethrough, and reflects the light beam with the second wavelength band. The first reflector 650 is configured to reflect the light beam propagating from the first dichroic element 600 to the inner annular section 180 of the color wheel 150. In the same time period, a position P1 that the light beam illuminates the inner annular section 180 of the color wheel 150 is located between a position P2 that the light beam illuminates the outer annular section 160 of the color wheel 150 and a center 152 of the color wheel 150.

Therefore, the light beam provided by the light source 100 illuminates the outer annular section 160 of the color wheel 150. A portion of the light beam is converted into the light beam with the second wavelength band and is reflected by the wavelength conversion segment 162. A portion of the wavelength conversion segment 162 may further include a reflective film to reflect the light beams with the first wavelength band and the second wavelength band. The light beam with the second wavelength band is then reflected by the first dichroic element 600 and the first reflector 650 sequentially to the inner annular section 180 of the color wheel 150, and is filtered to be light beams with different wavelength bands by the first filter segment 182 and the second filter segment 184 in sequence. The light beam then passes through the color wheel 150. Therefore, the illumination module of the present embodiment can generate light beams with different wavelength bands as long as the color wheel 150 continuously rotates.

Since the wavelength conversion material 163 of the present embodiment includes YAG phosphors, whose emission spectrum ranges from green to red light with wavelength ranging from about 500 nm to about 650 nm, only single wavelength conversion segment 162 can match the first filter segment 182 and the second filter segment 184 to obtain light beams with different wavelength bands to satisfy color gamut requirements. In addition, for the high power light beam with the first wavelength band, the yellow light emitted from the YAG phosphors can be filtered to get the red light, which has higher efficiency than the red light emitted from pure red phosphors. Also, the YAG phosphors have a good heat dissipation property. Moreover, the amounts of red light determine the brightness of projection frames. That is, under the white balance satisfaction, the more the red light fraction is, the higher brightness of the projection frames is. Therefore, the illumination module of the present embodiment is suitable for the high power light source 100 to increase the intensity of the projection frame and assist heat dissipation. In addition, the wavelength conversion segment 162 is disposed at the outer annular section 160 of the color wheel 150. Compared with the inner annular section 180, the outer annular section 160 has a longer arc length to facilitate the heat dissipation of the wavelength conversion segment 162. Moreover, since in the same time period, the position P1 that the light beam illuminates the inner annular section 180 of the color wheel 150 is located between the position P2 that the light beam illuminates the outer annular section 160 of the color wheel 150 and the center 152 of the color wheel 150, the first dichroic element 600 and the first reflector 650 can be disposed close to each other, facilitating miniaturization of the illumination module.

In this embodiment, the color wheel 150 can further include a transmission segment 194 disposed at the inner annular section 180 of the color wheel 150. Therefore, in one time period, the illumination module can generate the light beam with the second wavelength band when the actuator 200 disposes the transmission segment 194 on the traveling path of the light beam with the second wavelength band.

Figure 6B:
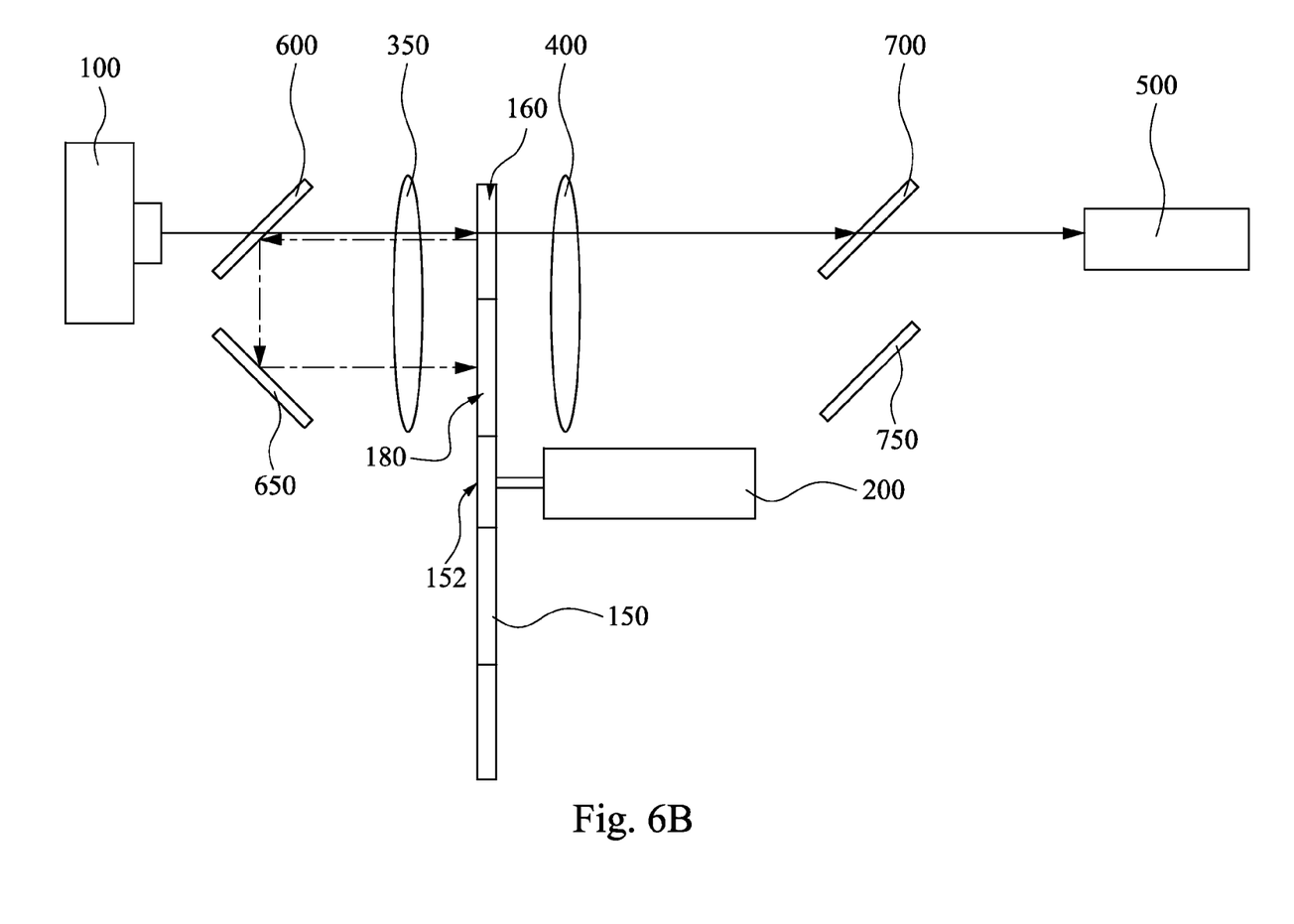
FIG. 6B is an optical diagram of the illumination module of FIG. 6A in another time periods.

FIG. 6B is an optical diagram of the illumination module of FIG. 6A in another time periods. Reference is made to FIGS. 6B and 7. In this embodiment, a portion of the light beam with the first wavelength band can pass through a portion of the wavelength conversion segment 162 of the color wheel 150. This portion of the wavelength conversion segment 162 may further include a dichroic mirror coating which allows the light beam with the first wavelength band to pass therethrough and reflects the light beam with the second wavelength band. The illumination module further includes a second dichroic element 700 and a second reflector 750. The second reflector 750 is configured to reflect the light beam passing through the inner annular section 180 of the color wheel 150. The second dichroic element 700 allows the light beam passing through the wavelength conversion segment 162 to pass therethrough, and reflects the light beam propagating from the second reflector 750. Moreover, the color wheel 150 further includes a light-blocking segment 196 disposed at the inner annular section 180 of the color wheel 150 and configured to block the light beam with the second wavelength band. For example, the light-blocking segment 196 can absorb or reflect the light beam with the second wavelength band.

In the time period of FIG. 6B, the actuator 200 rotates the light-blocking segment 196 on the traveling path of the light beam. The light beam provided by the light source 100 illuminates the outer annular section 160 of the color wheel 196. A portion of the light beam with the first wavelength band passes through the wavelength conversion segment 162 while another portion of the light beam with the first wavelength band is converted into the light beam with the second wavelength band and is reflected by the wavelength conversion segment 162. The light beam with the first wavelength band passes through the color wheel 150. The light beam with the second wavelength band is sequentially reflected by the first dichroic element 600 and the first reflector 650 to the inner annular section 180 of the color wheel 150, thereby being blocked (such as being absorbed or reflected) by the light-blocking segment 196. Therefore, in this time period, the illumination module can generate the light beam with the first wavelength band. The second dichroic element 700 and the second reflector 750 are configured for combining the light beams generated in different time periods to the same desired position.

In this embodiment, as mentioned above, in the same time period, since the position P1 that the light beam illuminates the inner annular section 180 of the color wheel 150 is located between the position P2 that the light beam illuminates the outer annular section 160 of the color wheel 150 and the center 152 of the color wheel 150, the second dichroic element 700 and the second reflector 750 can be disposed close to each other, facilitating miniaturization of the illumination module.

Reference is made to FIG. 7. In this embodiment, the light beam with the first wavelength band can be blue light, and the light beam with the second wavelength band, i.e., the emission light of the YAG phosphors, can be yellow light, where the second wavelength band ranges from about 500 nm to about 650 nm. The first filter segment 182 may be a red filter segment that allows red light to pass therethrough, and the second filter segment 184 may be a green filter segment that allows green light to pass therethrough. It is noted that in FIG. 7, the filter wavelengths, the arrangement, and the areas of the first filter segment 182 and the second filter segment 184 are illustrative only and should not limit the scope of the claimed invention. A person having ordinary skill in the art may select suitable filter wavelengths, arrangement, and areas for the first filter segment 182 and second filter segment 184 according to actual requirements.

Reference is made again to FIG. 6A. In this embodiment, the illumination module further includes a lens 350 disposed between the first dichroic element 600 and the color wheel 150 and between the first reflector 650 and the color wheel 150. More specifically, the light beams at different regions can be focused and be collected simultaneously by designing the curvature and the thickness of the lens 350. Therefore, only single lens is enough. Not only the space is saved, but also the assembly process is simplified. Moreover, the illumination module can further include a lens 400 disposed between the second reflector 750 and the color wheel 150 and between the second dichroic element 700 and the color wheel 150. The light beams can be focused and be collected simultaneously by designing the curvature and the thickness of the lens 400. Furthermore, the illumination module can further include an integral rod 500 disposed at the traveling path after the light beam leaves the second dichroic element 700. The light beam can be reflected many times inside the integral rod 500 for light uniformity.

Reference is made to FIGS. 6A and 7. In operation, in the first time period, the actuator 200 rotates the first filter segment 182, i.e., the red filter segment, on the traveling path of the light beam. The blue light, i.e., the light beam with the first wavelength band, emitted from the light source 100 illuminates the outer annular section 160, i.e., the wavelength conversion segment 162, of the color wheel 150 after passing through the first dichroic element 600 and being focused by the lens 350. The wavelength conversion segment 162 converts a portion of the blue light into yellow light, i.e., the light beam with the second wavelength band. Both of the yellow and the blue light are reflected by the wavelength conversion segment 162, collected by the lens 350, and then propagate back to the first dichroic element 600. Only the yellow light is reflected by the first dichroic element 600. The yellow light then reflected by the first reflector 650, being focused by the lens 350 again, and illuminates the first filter segment 182 of the inner annular section 180 of the color wheel 150. The yellow light is filtered as red light, which then passes through the color wheel 150, is collected by the lens 400, is sequentially reflected by the second reflector 750 and the second dichroic element 700, and enters the integral rod 500.

In the second time period, the actuator 200 rotates the second filter segment 184, i.e., the green filter segment, on the traveling path of the light beam. The blue light emitted from the light source 100 illuminates the color wheel 150. Since the traveling path of the light beam from the light source 100 to the inner annular section 180 of the color wheel 150 in this time period is the same as that in the first time period, a description in this regard will not be repeated hereinafter. After being focused by the lens 350, the yellow light illuminates the second filter segment 184 of the inner annular segment 180 of the color wheel 150, such that the yellow light is filtered as green light. The green light then passes through the color wheel 150, is collected by the lens 400, is sequentially reflected by the second reflector 750 and the second dichroic element 700, and enters the integral rod 500.

Reference is made to FIGS. 6B and 7. In the third time period, the actuator 200 rotates the light-blocking segment 196 on the traveling path of the light beam. The blue light emitted from the light source 100 illuminates the outer annular section 160, i.e., the wavelength conversion segment 162, of the color wheel 150 after passing through the first dichroic element 600 and being focused by the lens 350. A portion of the blue light passes through the wavelength conversion segment 162, is collected by the lens 400, passes through the second dichroic element 700, and enters the integral rod 500. Moreover, the wavelength conversion segment 162 converts another portion of the blue light into the yellow light, i.e., the light beam with the second wavelength band. The yellow light is reflected by the wavelength conversion segment 162, is collected by the lens 350, and is sequentially reflected by the first dichroic element 600 and the first reflector 650. The yellow light then is focused by the lens 350 and illuminates the light-blocking segment 196 of the inner annular section 180 of the color wheel 150, thereby being blocked (such as being absorbed or reflected) by the light-blocking segment 196.

Reference is made to FIGS. 6A and 7. In the fourth time period, the actuator 200 rotates the transmission segment 194 on the traveling path of the light beam. The blue light emitted from the light source 100 illuminates the color wheel 150. Since the traveling path of the light beam from the light source 100 to the inner annular section 180 of the color wheel 150 in this time period is the same as that in the first time period, a description in this regard will not be repeated hereinafter. After being focused by the lens 350, the yellow light illuminates the transmission segment 194 of the inner annular segment 180 of the color wheel 150, such that the yellow light passes therethrough. The yellow light is then collected by the lens 400, is sequentially reflected by the second reflector 750 and the second dichroic element 700, and enters the integral rod 500. Therefore, the illumination module of the present embodiment can generate the red light, the green light, the blue light, and the yellow light as long as the color wheel 150 continuously rotates.

It is noted that although the illumination module of the present embodiment generate yellow light by setting up the transmission segment 194 of the color wheel 150, in other embodiments, the transmission segment 194 can be replaced by a yellow filter segment to generate the yellow light that fits the color requirements. However, the claimed scope of the present invention is not limited in this respect.

Figure 8A:
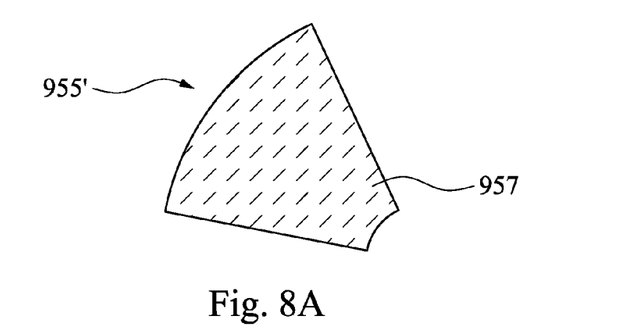
FIGS. 8A to 8H are schematic diagrams of a method for manufacturing a color wheel at different stages according to one embodiment of the present invention.

Another aspect of the present invention is to provide a method for manufacturing a color wheel 950 which can be applied to the color wheel 150 mentioned above. FIGS. 8A to 8H are schematic diagrams of the method for manufacturing the color wheel 950 at different stages according to one embodiment of the present invention. Reference is made to FIG. 8A. A plurality of sectional components are manufactured. For manufacturing each of the sectional components, an anti-reflection layer 957 can be formed (such as coated) on entire of a transparent plate 955'. The transparent plate 955' may be made of high transparent and heat-resistant materials such as a glass. The anti-reflection layer 957 allows visible light, whose wavelength ranges from about 400 nm to about 700 nm, to pass therethrough.

Figure 8B:
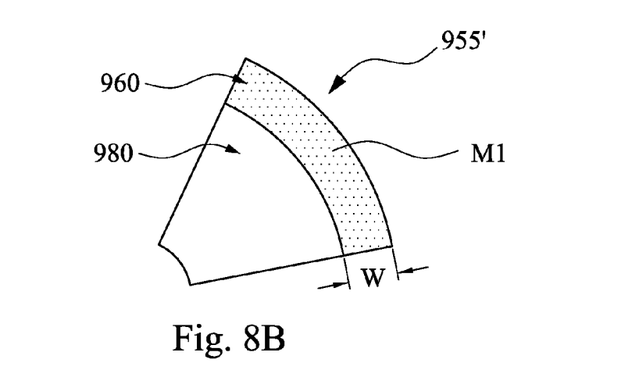

Reference is made to FIG. 8B. A first mask M1 is used to expose a first area 980 of the transparent plate 955' and block a second area 960 of the transparent plate 955'. The radius of the first area 980 has a smaller length than that of the second area 960. The first area 980 can correspond to the inner annular section 180 of FIG. 2, and the second area 960 can correspond to the outer annular section 160 of FIG. 2. The width W of the second area 960 may depend on the spot size of the incident light.

Figure 8C:
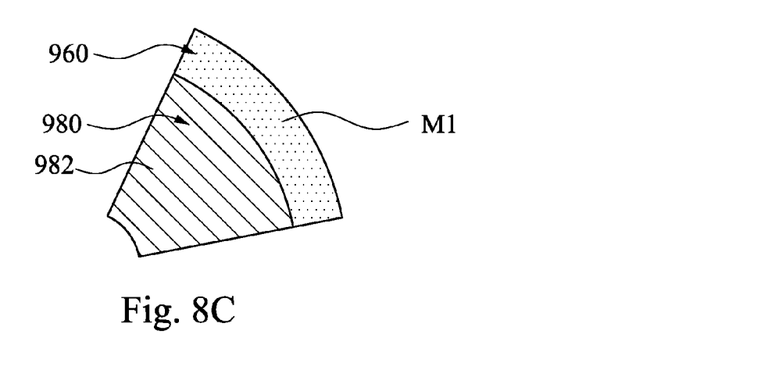

Reference is made to FIG. 8C. A filter layer 982 is formed (such as coated) on the first area 980. The filter layer 982 may be a red filter layer, a green filter layer, a blue filter layer, or a yellow filter layer, and the claimed scope of the present invention is not limited in this respect.

Figure 8D:
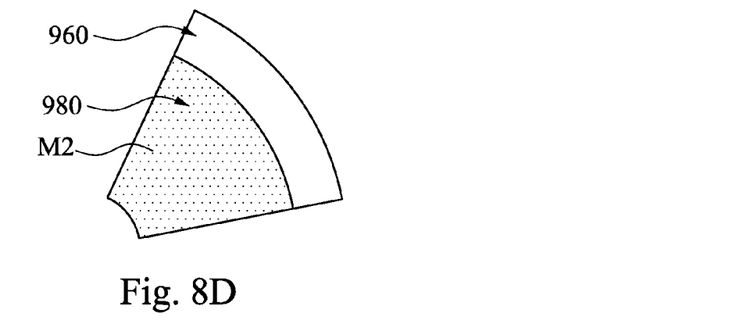

Reference is made to FIG. 8D. The first mask M1 of FIG. 8C is removed, and a second mask M2 is used to block the first area 980 and expose the second area 960.

Figure 8E:
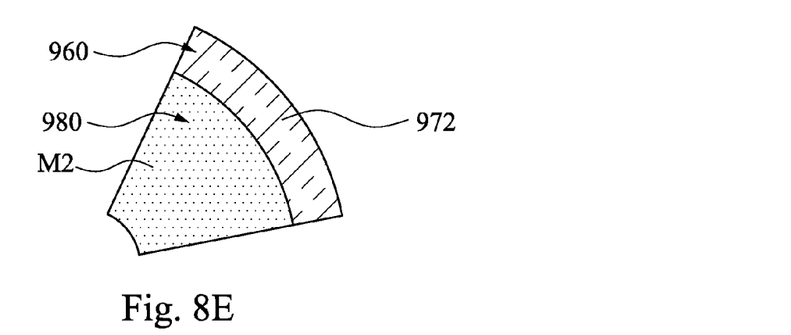

Reference is made to FIG. 8E. A reflective film 972 or a dichroic mirror is formed (such as coated) on the second area 960. For example, the reflective film 972 can reflect both of the light beam with the first wavelength band and the light beam with the second wavelength band mentioned above, and the dichroic mirror allows the light beam with the first wavelength band to pass therethrough and reflects the light beam with the second wavelength band. While this step is applied to the color wheel 150 of FIG. 7, the color wheels 150 of FIGS. 2, 3, and 5 can skip this step.

Figure 8F:
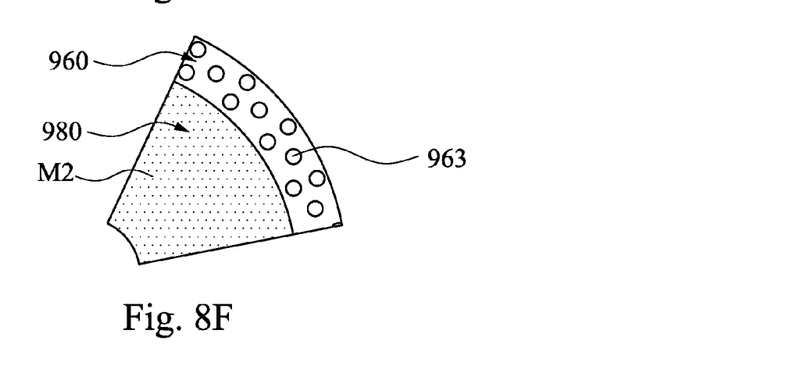

Reference is made to FIG. 8F. A plurality of wavelength conversion materials 963 are formed (such as coated) on the second area 960. The wavelength conversion materials 963 can include yttrium aluminum garnet (YAG) phosphors.

Figure 8G:
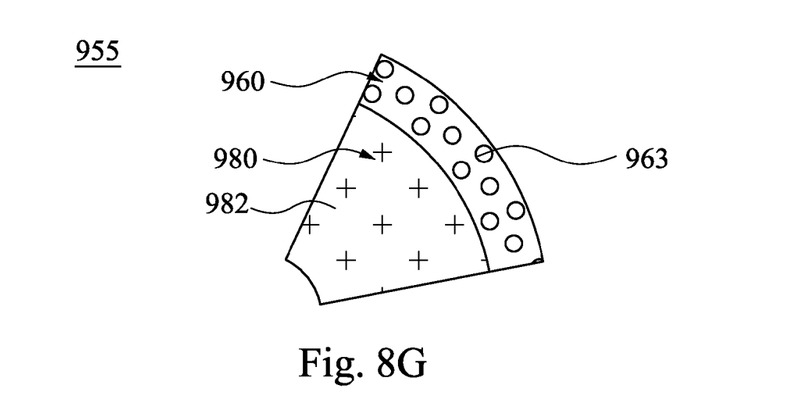

Reference is made to FIG. 8G. The second mask M2 of FIG. 8F is removed. Therefore, the manufacturing process of the sectional component 955 is accomplished.

Figure 8H:
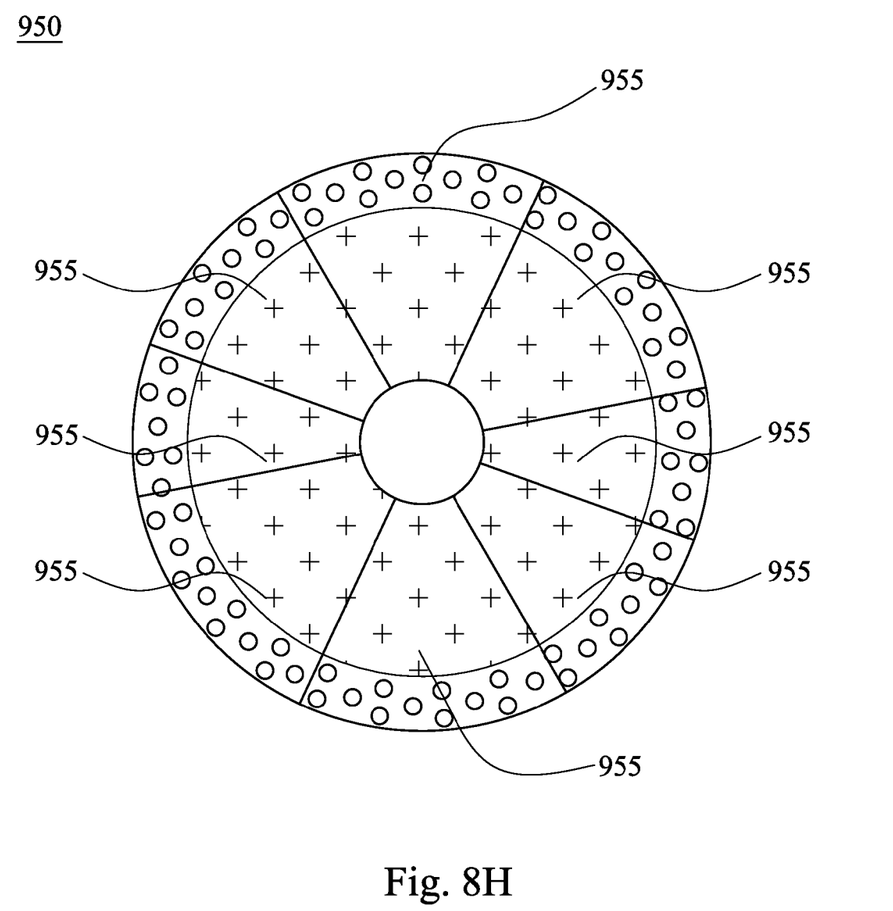

Reference is made to FIG. 8H. The sectional components 955 are assembled to form the whole color wheel 950. For example, the sectional components 955 can be assembled on the actuator 200 (see FIG. 1). Since each elements of the color wheel 950 of this embodiment are formed in a coating manner, the load of the actuator 200 can be reduced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An illumination module, comprising:
  a light source for providing a light beam with a first wavelength band;
  a color wheel disposed correspondingly to the light source along a traveling path of the light beam, the color wheel having an outer annular section and an inner annular section, wherein a radius of the inner annular section has a smaller length than a radius of the outer annular section, the color wheel comprising:
  a wavelength conversion segment disposed at the outer annular section, and configured to convert a portion of the light beam with the first wavelength band into a light beam with a second wavelength band, the wavelength conversion segment having at least one wavelength conversion material comprising yttrium aluminum garnet (YAG) phosphors; and
  a plurality of filter segments disposed at the inner annular section and respectively configured to filter desired wavelength bands of the light beam;
  an actuator connected to the color wheel and configured to rotate the color wheel; and
  a reflective unit disposed correspondingly to the color wheel along the traveling path of the light beam and configured to reflect the light beam passing through the outer annular section of the color wheel to the inner annular section of the color wheel, wherein in the same time period, a position that the light beam illuminates the inner annular section of the color wheel is located between a position that the light beam illuminates the outer annular section of the color wheel and a center of the color wheel.

2. The illumination module of claim 1, further comprising:
  a lens configured to focus the light beam illuminating the outer annular section of the color wheel and collect the light beam passing through the inner annular section of the color wheel.

3. The illumination module of claim 1, further comprising:
  a lens configured to collect the light beam passing through the outer annular section of the color wheel and focus the light beam illuminating the inner annular section of the color wheel.

4. The illumination module of claim 1, wherein the color wheel further comprises a transmission segment disposed at the outer annular section of the color wheel.

5. The illumination module of claim 4, wherein the color wheel further comprises a diffuser disposed at the inner annular section of the color wheel and adjacent to the transmission segment.

6. The illumination module of claim 1, wherein the color wheel further comprises a light-modulation segment disposed at the outer annular section of the color wheel, wherein the light-modulation segment is configured to convert a portion of the light beam with the first wavelength band into a light beam with a third wavelength band, and the light beam with the third wavelength band and the light beam with the first wavelength band are mixed to be a light beam with a fourth wavelength band.

7. The illumination module of claim 6, wherein the light-modulation segment is made of a material comprising lutetium aluminum garnet (LuAG), silicon oxynitride, silicone, or any combination thereof.

8. The illumination module of claim 1, wherein the reflective unit comprises a first reflector and a second reflector, the first reflector is configured to reflect the light beam passing through the outer annular section of the color wheel to the second reflector, and the second reflector is configured to reflect the light beam propagating from the first reflector to the inner annular section of the color wheel.

9. An illumination module, comprising:
  a light source for providing a light beam with a first wavelength band;
  a color wheel disposed correspondingly to the light source along a traveling path of the light beam, the color wheel having an outer annular section and an inner annular section, wherein a radius of the inner annular section has a smaller length than a radius of the outer annular section, the color wheel comprising:
  a wavelength conversion segment disposed at the outer annular section, configured to convert a portion of the light beam with the first wavelength band into a light beam with a second wavelength band, and reflecting the light beam with the second wavelength band, and the wavelength conversion segment having at least one wavelength conversion material comprising yttrium aluminum garnet (YAG) phosphors; and
  a plurality of filter segments disposed at the inner annular section and respectively configured to filter desired wavelength bands of the light beam;
  an actuator connected to the color wheel and configured to rotate the color wheel;

a first dichroic element disposed between the light source and the color wheel along the traveling path of the light beam, allowing the light beam with the first wavelength band to pass therethrough, and reflecting the light beam with the second wavelength band; and a first reflector configured to reflect the light beam propagating from the first dichroic element to the inner annular section of the color wheel, wherein in the same time period, a position that the light beam illuminates the inner annular section of the color wheel is located between a position that the light beam illuminates the outer annular section of the color wheel and a center of the color wheel.

10. The illumination module of claim 9, further comprising:

a lens disposed between the first dichroic element and the color wheel and between the first reflector and the color wheel.

11. The illumination module of claim 9, wherein the color wheel further comprises a transmission segment disposed at the inner annular section of the color wheel.

12. The illumination module of claim 9, wherein a portion of the light beam with the first wavelength band is allowed to pass through a portion of the wavelength conversion segment of the color wheel, and the illumination module further comprises:

a second reflector configured to reflect the light beam passing through the inner annular section of the color wheel; and a second dichroic element allowing the light beam passing through the wavelength conversion segment to pass therethrough, and reflecting the light beam propagating from the second reflector.

13. The illumination module of claim 12, further comprising:

a lens disposed between the second reflector and the color wheel and between the second dichroic element and the color wheel.

14. The illumination module of claim 12, wherein the color wheel further comprises a light-blocking segment disposed at the inner annular section of the color wheel and configured to block the light beam with the second wavelength band.

15. A method for manufacturing a color wheel, comprising:

manufacturing a plurality of sectional components, wherein manufacturing each of the sectional components comprises:

using a first mask to expose a first area of a transparent plate and block a second area of the transparent plate, a radius of the first area having a smaller length than a radius of the second area;

forming a filter layer on the first area;

removing the first mask;

using a second mask to block the first area and expose the second area;

forming at least one wavelength conversion material on the second area; and removing the second mask; and assembling the sectional components to form the whole color wheel.

16. The method of claim 15, wherein the wavelength conversion material comprises yttrium aluminum garnet (YAG) phosphors.

17. The method of claim 15, wherein manufacturing each of the sectional components further comprises:

forming a reflective film or a dichroic mirror on the second area before forming the wavelength conversion material.

18. The method of claim 15, wherein manufacturing each of the sectional components further comprises:

forming an anti-reflection layer on entire of the transparent plate.

* * * * *